United States Patent [19]

Black

[11] Patent Number: 5,074,336

[45] Date of Patent: Dec. 24, 1991

[54] LIGHTWEIGHT PIPE CLIP FOR MAINTAINING AN END PLUG INSERTABLY COUPLED TO AN IRRIGATION PIPE OUTLET

[76] Inventor: Earl E. Black, P.O. Box 58, Belfry, Mont. 59008

[21] Appl. No.: 609,842

[22] Filed: Nov. 7, 1990

[51] Int. Cl.⁵ .............................................. F16L 55/10
[52] U.S. Cl. .................................... 138/89; 138/96 R; 215/287
[58] Field of Search ..................... 138/89, 96 R, 96 T, 138/178, 177; 215/287

[56] References Cited

U.S. PATENT DOCUMENTS

| | | | |
|---|---|---|---|
| 205,011 | 6/1878 | Templeton | 215/287 |
| 337,202 | 3/1886 | Seymour | 215/287 |
| 363,870 | 5/1887 | Wetzel | 215/287 |
| 511,645 | 12/1893 | Nichols | 215/287 |
| 515,010 | 2/1894 | Patterson | 215/287 |
| 545,307 | 8/1895 | Pool | 138/89 |
| 779,678 | 1/1905 | Wandell | 215/287 |
| 1,292,919 | 1/1919 | Thatcher | 215/287 |
| 1,630,466 | 5/1927 | Börgesen | 215/287 |
| 2,526,238 | 10/1950 | Kendall | 138/89 |

FOREIGN PATENT DOCUMENTS

| | | | |
|---|---|---|---|
| 13416 | 7/1910 | Denmark | 215/287 |
| 663607 | 7/1936 | Fed. Rep. of Germany | 215/287 |
| 1264570 | 5/1961 | France | 138/89 |
| 138282 | 2/1920 | United Kingdom | 215/287 |

*Primary Examiner*—James E. Bryant, III
*Attorney, Agent, or Firm*—Sughrue, Mion, Zinn, Macpeak & Seas

[57] ABSTRACT

A pipe clip of open frame strip material is formed of a front half ring, having a diameter slightly in excess of the outside diameter of an irrigation pipe about which the half ring is fitted. An inverted L-shaped support member includes a horizontal top bar and a vertical right angle rear clamping bar whose ends are respectively fixed to the center of the half ring and to the center of a base horizontal rear cross bar. The horizontal rear cross bar of the base is integral with a pair of horizontal laterally opposed parallel arms whose ends remote from the base rear cross bar are fixed to the ends of the half ring respectively. A cylindrical end plug fitted internally of the open end of an irrigation pipe is maintained in position. Preferably, the irrigation pipe has an integral radially outwardly projecting collar which prevents axial movement of the pipe clip upon engagement of the half ring with the side of the collar remote from the open end of the irrigation pipe. The vertical rear clamping bar and the rear cross bar engage the vertical end face of the end plug to prevent movement of the end plug out of the irrigation pipe under the forces developed by water attempting to escape the interior of the irrigation pipe. The clip may be readily dropped in place over the end of the irrigation pipe with the end plug in place, axially inserted within the open end of the irrigation pipe.

3 Claims, 1 Drawing Sheet

LIGHTWEIGHT PIPE CLIP FOR MAINTAINING AN END PLUG INSERTABLY COUPLED TO AN IRRIGATION PIPE OUTLET

FIELD OF THE INVENTION

This invention relates to capping off the open end or outlet of an irrigation pipe for terminating fluid flow therethrough and more particularly to a lightweight, low cost, easily removable high strength pipe clip for maintaining an axially insertable cylindrical plug sized to the internal diameter of the irrigation pipe within the open end of that pipe.

BACKGROUND OF THE INVENTION

The discharge or outlet ends of irrigation pipe are required to be periodically closed off and opened to control the flow of water therethrough. Such measures must be cheap, easily obtained and must not add significantly to the weight of the irrigation apparatus. This eliminates the integration of valves into the pipe itself.

Pipeline closures have been effected in the past. U.S. Pat. No. 2,526,238 to Kendall has a hollow cylindrical end cap which fits over the open end of a pipe of circular ring form with the cylindrical cap having an integral, vertical end wall which closes off the open end of the pipe. Means are provided for locking the end cap to the open end of the pipe. A slit ring coupled by diametrically opposite arms to the cap forms a collar which may be tightly drawn down about the pipe by rotation of clamping bolts through lugs having tapped bores. The clamping bolt has left hand and right hand threads over portions from its middle point towards a handle with the opposite direction threads being threaded to respective lug bores.

End closure retainers for holding stoppers within openings of cylindrical structures such as bottles and adapted to maintain corks within such bottle necks are found within U.S. Pat. Nos. 205,011, 337,202, 363,870, 511,645 and 1,292,919.

While patents directed to bottle cork holding clamps, bottle stopper retainers and the like may suggest certain approaches to maintaining bottle stoppers or corks in position, the particular problem at hand requires a mechanism which is lightweight, which has high strength and which is adapted particularly to maintaining a cylindrical plug axially inserted within the interior of an irrigation pipe at its outlet end. Such device must be capable of maintaining plug closure of the open end of the irrigation pipe, irrespective of the forces developed by water under some pressure interior of the pipe, trying to force the end plug or closure from that closed off pipe end. Additionally, the mechanism must be readily removable from the pipe both for quick closure of the pipe end or opening of the same while permitting the mechanism to be readily manually carried over some distances to and from the irrigation pipe itself.

It is therefore a primary object of the present invention to provide an improved lightweight, readily removable, high strength, low cost pipe clip in the form of an open frame structure, which may be readily coupled to the open end of an irrigation pipe, which eliminates the necessity for squeezing down a retainer ring about the periphery of the irrigation pipe to lock the clip to the pipe itself, and which is particularly adapted to belt end irrigation pipes.

SUMMARY OF THE INVENTION

The invention is directed to a pipe clip for use in maintaining a cylindrical end plug inserted within the open end of an irrigation pipe, or a hollow cylindrical end cap about the exterior of the open end of such irrigation pipe and preferably where the irrigation pipe terminates in a belt end having an integral radially projecting collar, axially inward of the open end of the irrigation pipe. The clip is comprised of a semi-circular arcuate half ring, a U-shaped clamping base of strip form having a cross bar and integral laterally opposed arms, extending at right angles therefrom in parallel fashion, and joined to respective ends of the semi-circular arcuate half ring, and an inverted L-shaped support member, including a vertical, rear clamping bar fixedly coupled to the base cross bar, at the center thereof, and an integral right angle top bar extending from the vertical clamping bar to the semi-circular arcuate half ring and being fixed thereto at the center of that half ring.

Preferably, the clip is formed of stainless steel strip material, with the parts thereof being welded together to form a lightweight metal high strength unitary structure.

Where the irrigation pipe terminates in a radially outwardly projecting collar or belt end, axially inwardly of the open end thereof, the pipe clip base arms and clamping bar top bar include arcuate bend, therein conforming to the irrigation pipe collar and sized thereto whereby the pipe clip engages the collar to prevent axial movement of the clip along the outer periphery of the irrigation pipe and release of the end plug or end cap from the closed off irrigation pipe in response to pressure developed internally of the irrigation pipe by water attempting to flow therethrough.

DESCRIPTION OF THE PREFERRED EMBODIMENTS

Figure 1:
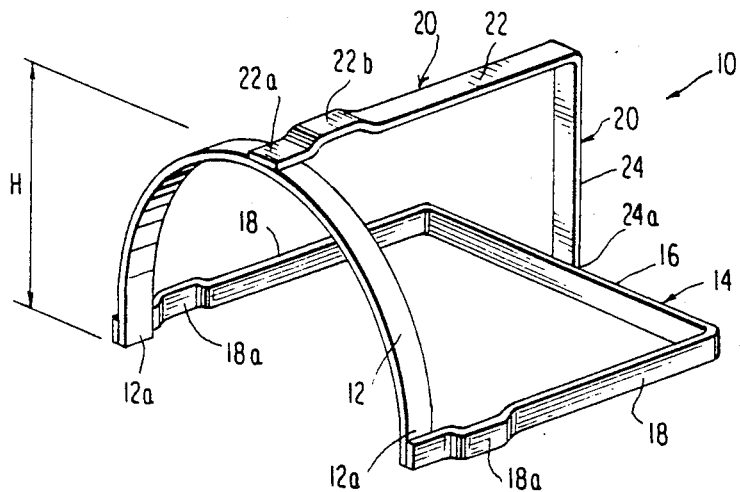
FIG. 1 is a perspective view of a pipe clip forming a preferred embodiment of the invention.
Figure 2:
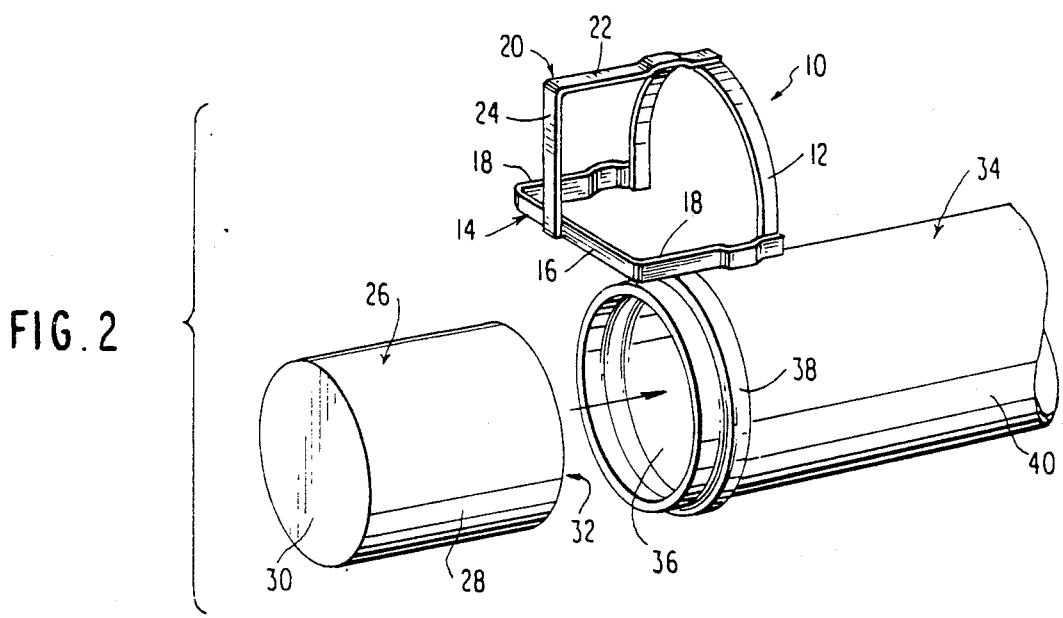
FIG. 2 is an exploded perspective view of a clip, and a portion of an irrigation pipe at the outlet end thereof with the plug in place and with the clip of FIG. 1 partially dropped in place over the plug and collar of the irrigation pipe.
Figure 3:
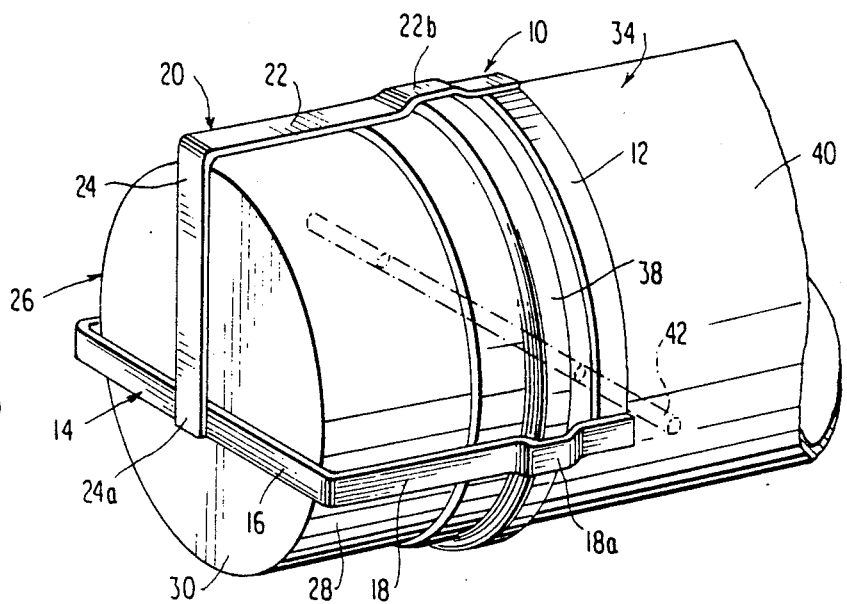
FIG. 3 is a perspective view of the irrigation pipe, the end plug and the installed pipe clip of FIG. 1.

Referring to the drawings. FIG. 1 illustrates the pipe clip indicated generally at 10 forming a preferred embodiment of the invention as an integral structure consisting of three elements. The elements in this case are formed of steel metal strip stock, of given configuration, with the elements being welded together at their junction points. An arcuate half ring 12 is required to have a diameter approximating but slightly in excess of the outside diameter of the irrigation pipe to which it is applied as per FIGS. 2 and 3 and additionally, the half ring is required to have a vertical height H in excess of the radius of the irrigation pipe to which the clip is to be exteriorly mounted. Fixedly joined to opposed ends 12a of the half ring 12 is a U-shaped base member 14 including a horizontal, rear cross bar 16, which is of a length in excess of the diameter of the end plug or end cap employed in closing off the outlet end of the irrigation pipe of FIGS. 2 and 3. Integrally with the rear cross bar, the base 14 includes laterally spaced, opposed integral arms 18 which are at right angles to the base and parallel to each other. The arms 18 must be of a length in excess of the distance from the end of the irrigation pipe and the integral collar and may be several inches in excess thereof, but not of excess length, such that the axially inserted end plug or cylindrical end cap in the alternative having a cylindrical side wall enveloping the open end of the irrigation pipe axially outwardly of the integral collar cannot shift axially such that the end of the irrigation pipe is no longer closed off and the water may escape therefrom. To provide the necessary strength to the open frame pipe clip, the third element of this integral structure is an inverted L-shaped support member, indicated generally at 20, and consisting of a horizontal top bar 22 having a front end 22a which is welded to half ring 12 at the center thereof, being of a length equal to the length of the arms 18 of base 14, and terminating in a right angle vertically downward directed rear clamping bar 24 whose lower end 24a is welded to the base rear cross bar 16 intermediate of its ends. The end plug 26 may be a solid non-porous lightweight cylindrical member whose diameter is slightly less than the inside diameter of the irrigation pipe as illustrated in FIGS. 2 and 3. The end plug 26 may alternatively be formed of molded plastic and may be of hollow cylindrical form, including a hollow cylindrical side wall 28 closed off at one end by an integrally molded transverse end wall 30, and whose opposite end 32 is open. As such, the end plug 26 is axially insertable into the interior of the irrigation pipe indicated generally at 34, at an open outlet end 36, having an integral radially outwardly projecting collar 38. Such irrigation pipes are known as belt end irrigation pipes. The collar may be several inches axially inward from the open outlet end 36 of the irrigation pipe. The radial projection of the collar may be several inches beyond the radius of the outer periphery 40 of the irrigation pipe.

With end plug 26 axially inserted within the outlet 36 of the irrigation pipe, the pipe clip 10 is installed in accordance with the sequence shown in FIGS. 2 and 3. The open frame pipe clip 10 is simply dropped down onto the assembly of the irrigation pipe 34 and its end plug 26 such that the rear clamping bar moves down and across the vertical end wall 30 of the end plug, with the laterally opposed arms 18 of base 14 moving over the outside periphery of the cylindrical side wall 28 of the end plug and the outer periphery 40 of the pipe. In order to accomplish that action, both the integral arms 18 of the base 14 and the top bar of the pipe clip are provided with integral U bends, as at 18a for the arms, and 22b for the top bar, thereby permitting the half ring to encircle the outer periphery of the irrigation pipe rearwardly of the integral collar 38 forming the belt end of the irrigation pipe 34. As such, the axial forces developed on the end wall 30 of the end plug 26 causes the plug to move axially to the extent where the pipe clip half ring is pulled towards the collar 38 with the U bends 18a, 22b engaging the collar 38, thereby preventing the and plug from moving outwardly of the open end 36 of the irrigation pipe and maintaining the outlet end of the irrigation pipe sealed.

It is envisioned that where the irrigation pipe is not provided with a collar, that is, an irrigation pipe without a belt end, the pipe clip may be readily installed and maintained in place by having a rod of a length in excess of the diameter of the irrigation pipe 34 passing through the irrigation pipe horizontally via aligned holes sized to the diameter of the rod as indicated in dotted line fashion, FIG. 3, at 42, whereby the rod acts to contact the open frame pipe clip half ring to physically prevent axial shifting of the pipe clip once installed about the irrigation pipe at its outlet end with end plug (or end cap) in place.

As mentioned previously, the pipe clip may be installed to capture a cup-shaped end cap having a hollow cylindrical side wall whose internal diameter is slightly larger than the outside diameter of the irrigation pipe on the open end of the irrigation pipe such as the belt end pipe 34 illustrated in the drawing, and where the cylindrical side wall of the end cap surrounds the outer periphery 40 of the irrigation pipe 34 but only up to the extend of the hollow irrigation pipe axially beyond collar 38 in the direction of the outlet opening 36 within that pipe. Of course, where no collar 38 is provided, the only limitation in movement of a hollow end cap axially on the open end of the irrigation pipe is where the vertical end wall, such as end wall 30 of element 26 (assuming that the diameter of the cylindrical portion 28 of that end plug were larger than the outside diameter 40 of the pipe 34) was placed on such pipe. In similar fashion to the pipe clip, end plug and irrigation pipe installation of FIG. 3, in this case, by the utilization of rod 42 passing through the irrigation pipe diametrically from one side to the other, horizontally oriented, and internally of half ring 12 of pipe clip 10, the rod would be in a position axially inwardly of the open end 36 of the irrigation pipe whose only modification from that shown in FIGS. 1, 2 and 3 would be the absence of the collar 38.

From the above description, it is apparent that the pipe clip 10 readily secures an axially inserted end plug to an irrigation pipe at its outlet end, or an end cap on the outer periphery of such irrigation pipe outlet end, closing off the open end of the irrigation pipe in the manner of the end plug described in detail in this application. The use of the pipe clip and the closing off of the open end of the irrigation pipe is instantly obtained in a very simply manner. The action is one of inserting the end plug in the pipe, placing the clip on the pipe and dropping it in place and pushing down the top bar 22 and arms 18 into intimate contact with the end plug and the irrigation pipe. The pipe clip 10 may be used on any type of pipe but preferably a pipe having a belt end to retain the end plug by engagement of the half ring 12 with the collar of the irrigation pipe. In the alternate form, if the pipe is devoid of the collar, once the pipe clip is in position, a rod must then be inserted through aligned, horizontal holes within the irrigation pipe at diametrically opposed position and inside of the open frame pipe clip as illustrated in dotted line fashion, FIG. 3.

The pipe clip has been described as being formed of steel strip stock; however, the material of the clip may be aluminum, plastic, resin reinforced fiberglass or like material. Where the clip material is formed of metal, mild steel may be employed as in the illustrated embodiment and in which the parts may be readily welded together and forming a lightweight open frame high strength retaining structure.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A pipe clip for closing off the outlet of an irrigation pipe supporting a cylindrical end plug axially internally of the open end of the pipe or a hollow cylindrical cup form end cap having a cylindrical side wall encircling the outer periphery of the pipe at the open end thereof, said pipe clip comprising:

- a semi-circular arcuate half ring;
- a U-shaped base of strip form, including a cross bar and a pair of integral right angle, laterally spaced, parallel arms, the ends of said arms remote from said cross bar, being fixed to the ends of the semi-circular half ring and extending at right angles to a plane defined by the semi-circular half ring;
- an inverted L-shaped support member consisting of a top bar of a length equal to the arms of said U-shaped base and an integral right angle rear clamping bar,
- and wherein the end of the top bar remote from said clamping bar is fixed to the semi-circular half ring at the center thereof, extends parallel to and above the spaced parallel arms of the U-shaped base, and the end of the rear clamping bar, remote from the integral top bar, is fixed to the base cross bar at the center thereof forming a lightweight, removable high strength open frame assembly with the half ring encircling the outer periphery of the irrigation pipe, and the clamping bar and the base rear cross bar engaging the end plug or end cap to maintain coupling between the end plug and end cap and the irrigation pipe at its open outlet end.

2. The pipe clip as claimed in claim 1 for an irrigation pipe which includes a radially outwardly projecting collar about the outer periphery of the pipe, axially inward of the open outlet end thereof, and wherein at least the integral laterally spaced arms of the base further include oppositely direct U bends therein at positions corresponding to the collar and engaging the collar to limit axial movement of the pipe clip upon engagement with the periphery of the irrigation pipe and the end plug or end cap coupled thereto.

3. The pipe clip as claimed in claim 2, wherein the height of the half ring is in excess of one half the diameter of the outside diameter of the irrigation pipe to ensure retention of the half ring on the irrigation pipe and to the side of the collar remote from the open end of the irrigation pipe.

* * * * *